June 9, 1959   H. ORNER   2,889,729
APPARATUS FOR SCREW TENSIONING TO ELONGATION VALUES
Filed Dec. 28, 1955

INVENTOR:
HARRY ORNER
ATTORNEY

United States Patent Office 2,889,729
Patented June 9, 1959

2,889,729

APPARATUS FOR SCREW TENSIONING TO ELONGATION VALUES

Harry Orner, Altadena, Calif.

Application December 28, 1955, Serial No. 555,804

26 Claims. (Cl. 81—52.4)

This invention relates to a screw tensioning device, and more particularly to a novel extensometer for measuring the elongation of a threaded member being tensioned as well as a novel wrench unit for use with the extensometer in applying a predetermined tension to bolts, studs, cap screws and the like.

In the use of bolts and similar threaded fasteners for retaining members at high stresses, a properly tightened nut is one which applies to the bolt a tension load at least equal to the external load on the bolt assembly. When this condition is fulfilled, the bolt will not fail by fatigue since it cannot experience a change in stress regardless of the fluctuating nature of the load.

In attempting to tighten nuts in a manner applying the desired tension load as indicated above, it is conventional practice to employ a torque wrench; that is to say, a device for measuring the force applied through a given lever arm in order to turn the nut. However, to operate a torque wrench successfully, the services of a skilled technician are required to establish the torque force for the particular assembly. It is also important that the wrench be used by a mechanic skilled in maintaining the torque wrench in motion, because of differences in magnitude between dynamic and static friction. Although, the force of wrenching the nut is largely represented by friction losses in the threads of the bolt, yet such factors as lubrication, plating, surface finish, etc., also create variables in the friction losses which can greatly alter the torque requirement of the assembly. Because of these variables it is difficult to employ a torque wrench in a manner to utilize fully the actual strength of the bolt or other threaded fastener being tightened. Accordingly, it has been common practice in using torque wrenches to allow for these variables by adopting as the final tensile load stress a value approximately 85 percent of the yield stress of the screw member being tensioned thereby sacrificing the advantages to be realized if the bolt could be loaded to its yield stress.

In view of the above factors characteristic of the use of torque wrenches to tighten nuts and other threaded fasteners, it is an object of the present invention to provide a screw tensioning apparatus which operates independently of the applied torque force and of variables within the fastener itself, including friction losses, the bending of the threads and the expansion of the nut under load.

More specifically, it is an object of the invention to provide a screw tensioning apparatus which measures the elongation of a bolt while it is being tensioned and which makes possible termination of the wrenching at the very end of the safe permissible elongation, thereby permitting the fastener to be stressed in close approximation to the yield stress of the fastener material and simultaneously measuring the arc of wrenching corresponding to this permissible elongation. Stated differently, it is a primary object of the invention to provide a screw tensioning apparatus for measuring the angle of wrenching to place a given fastener under a load stress closely approximating its yield stress as determined by simultaneously measuring fastener elongation, whereby similar fasteners can be tightened uniformly to a desired maximum load stress by wrenching through the same angle.

A further object of the invention is to provide a wrench unit adapted to tighten a threaded fastener to remove all looseness and play in the threads, and thereafter operable to wrench the fastener through a predetermined angle required to load the fastener to a final stress closely approximating the yield stress of the material of which it is made.

An additional object is to provide a highly reliable extensometer of simple and inexpensive construction which can be temporarily supported by the opposite ends of the fastener to measure fastener elongation without interfering with the wrenching of the fastener.

These and other objects and advantages of the invention will be more fully set forth in the following specification and claims considered in connection with the attached drawings to which they relate, and wherein:

Figure 3:
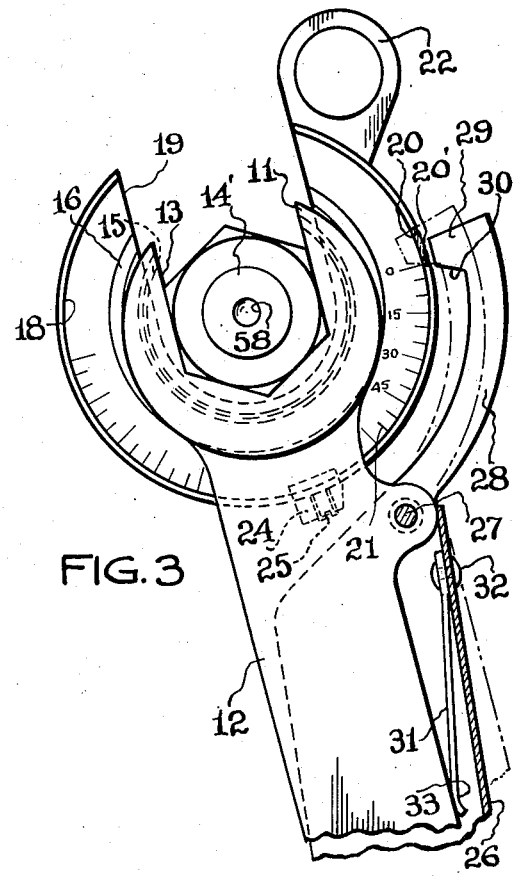
Figure 4:
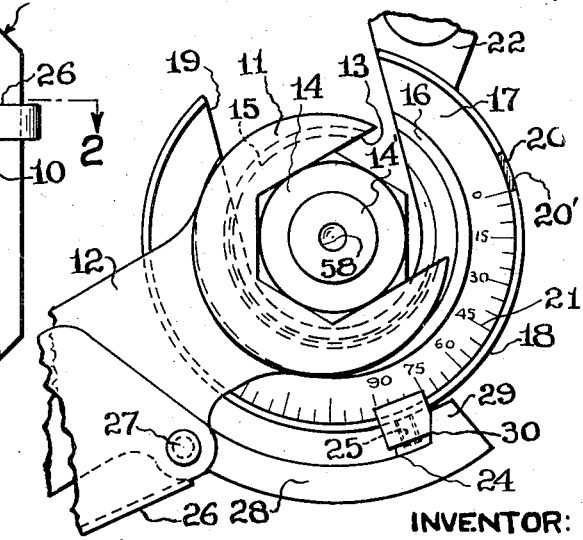

Figure 3 is an enlarged fragmentary view of the wrench tightening a nut and showing the position of parts at the moment the indexing ring is declutched thereby indicating that the nut has been tightened to remove all looseness in the threads and that the parts are secured together; and Figure 4 is a view similar to Figure 3, but showing the relative positions of the wrench and indexing ring as the bolt is placed under its desired full load stress.

Figure 2:
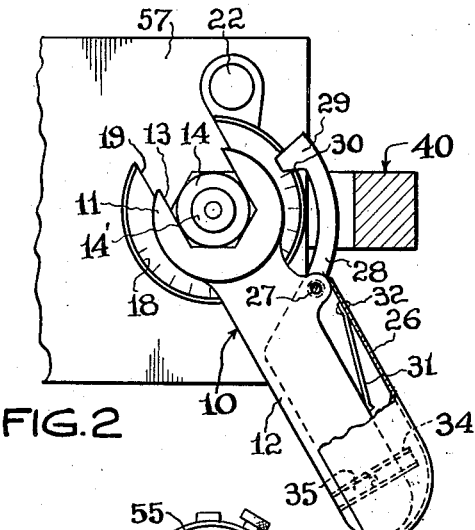
Figure 2 is a horizontal sectional view taken along line 2—2 of Figure 1 with a portion of the wrench handle broken away to show structural details.
Figure 1:
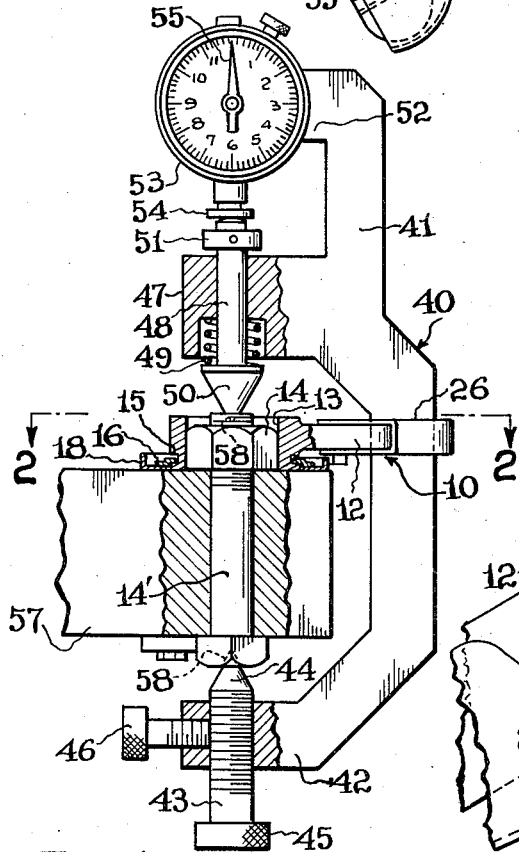
Figure 1 is an elevational view with certain parts in section showing a nut and bolt fastener being tightened by the screw tensioning apparatus of this invention.

Referring again to the drawings and particularly to Figure 1, it will be seen that my screw tensioning apparatus comprises two principal parts or units consisting of a wrench unit generally designated 10 and an extensometer generally designated 40. The wrench unit will be described first, reference being made to Figures 2, 3 and 4 wherein it is shown as comprising a head 11 with an integral handle-like extension or arm 12. The head is provided with the usual nut-receiving slot 13 of hexagonal shape at its inner nut seating end to fit a hexagonally shaped nut 14 for a bolt 14'. As best shown in Figure 1, the wrench head extends below the handle plane and is there provided with an outwardly opening groove 15 for rotatably seating a seating ring 16 secured to the inner end of an indexing ring 17. Seating ring 16 preferably has a frictional fit in the groove 15 and a small but definite force must be applied to rotate the indexing ring relative to the wrench head. It should also be noted that indexing ring 17 has an upturned flange or rim 18 and a slot 19 somewhat wider than slot 13 in head 11 and which is sized so that it encircles the nut 14 in spaced relationship to enable the indexing ring to be freely rotated relative to the nut. Flange 18 extends circumferentially about the outer edge of the indexing ring and has a notch 20 near its right-hand end presenting a vertical abutment or shoulder 20' for a purpose to be described presently. Distributed along the top surface of the indexing ring are suitable indicia extending clockwise from a zero point opposite shoulder 20' to a point near slot 19. While this indicia may be marked in any desirable manner, it is convenient to have the markings represent degrees of arc. Projecting outwardly from the indexing ring near the right-hand corner of slot 19, as viewed in Figures 2 or 3, is a lever or knob 22 which can be used by the operator either to rotate the indexing ring or to hold it against rotation with respect to the wrench. Slidably supported for movement along flange 18 is a stop 24 which can be locked in place at any point along the flange by a set screw 25.

The operating handle 26 for the wrench comprises a hollow member enclosing arm 12 on three sides and pivoted to it by a pivot pin 27 at a point near the latter's junction with head 11. Extending forwardly from handle 26 is an arcuate pawl 28 carrying an inwardly projecting latch detent 29 at its forward end, the latter being movable into and out of notch 20 of the indexing ring while positioned in radial alignment therewith. The interior sloping edge 30 of latch 29 is adapted to engage the vertical shoulder 20' of the indexing ring thereby, anchoring the ring against rotation with its slot 19 aligned with the nut-receiving slot 13 in the wrench head. Handle 26 is normally held pivoted away from arm 12 to the extent illustrated in Figure 2 by a leaf spring 31 having its forward end secured to the interior of handle 26 by a rivet 32 and its free end 33 bearing against the adjacent edge of arm 12. It is to be understood that the spring is sufficiently strong to prevent handle 26 from pivoting toward arm 12 and the declutching of detent 29 from notch 20 in flange 18 of the indexing ring until all looseness in the threads of the fastener and the parts being secured together has been taken up. That is to say, for purposes of a specific illustration, spring 31 resists the declutching of the indexing ring and the closing of handle 26 toward arm 12 until nut 14 has been screwed onto the threads of bolt 14' to a point at which further wrenching begins to tension the bolt. An adjustable stop screw 34 extends beyond a mounting opening 35 near the outer end of arm 12 to limit the clockwise pivoting of handle 26 relative to arm 12 upon the flexing of spring 31.

The second principal sub-assembly of the screw tensioning apparatus of this invention comprises an extensometer adapted to be directly supported by the opposite ends of the fastener element to be tensioned and operable to measure the elongation of this element as it is placed under stress by the wrench unit described above. The extensometer 40, shown in its mounted operating position in Figure 1, comprises a reversed E-shaped frame 41 through the lower arm 42 of which extends a vertical screw 43 having a pointed upper end 44 and a knurled head 45. This screw can be clamped against turning by a set screw 46 extending into the end of arm 42. The middle arm 47 of frame 41 supports for vertical displacement a plunger 48 which is urged downwardly at all times by a spring 49 interposed between the lower side of the arm and a conical end cap 50 on the plunger. The downward displacement of plunger 48 is limited by a collar 51 secured to the upper end of the plunger.

Rigidly supported on the upper arm 52 of frame 41 is a precision dial gauge 53 having a scale preferably reading in mils. A plunger 54 projecting from the bottom of the gauge and normally resting against the top of plunger 48 is suitably connected interiorly of the gauge to rotate pointer 55 clockwise about the gauge scale upon being itself displaced vertically upward.

As illustrated in Figure 1, the extensometer is mounted vertically upon the opposite ends of a bolt-type threaded fastener 14' extending through a bore in a rigidly supported member or anvil 57 and having a nut 14 threaded downwardly against the top surface of member 57. Bolt 14' is provided with conical center holes or seats 58 at its opposite ends adapted to seat the conical ends of screw 43 and plunger 48, the latter being urged downwardly by spring 49 with sufficient pressure to hold the extensometer firmly supported.

*Operation*

Assuming that a bolt 14' and nut 14 have been assembled through a bore in member 57 and that the extensometer has been mounted upon the bolt by seating the conical ends of screw 43 and plunger 48 in the conical recesses 58 at the opposite ends of the bolt, with spring 49 holding the suitably-shaped seating members firmly in seated position, the operation of the device is as follows: First, the operator makes certain that the extensometer 40 is properly seated and that needle 55 of sensitive gauge 53 is in registry with the zero reading of the scale on the face of the gauge. This is accomplished by turning screw 43 to vary the position of plunger 48 with respect to frame 41 and the gauge case rigidly carried thereby. Turning screw 43 upward through arm 42 acts to lower frame 41 with respect to plunger 48 and to rotate needle 55 counterclockwise, while turning screw 43 downward allows the frame to be elevated with respect to plunger 48 by means of spring 49 and acts through gauge plunger 54 to rotate needle 55 clockwise. Once needle 55 is opposite the zero reading, thumb screw 46 is tightened against screw 43 to lock the extensometer in its proper operating position.

Wrench unit 10 is then placed upon nut 14 as best illustrated in Figure 2 and rotated clockwise sufficiently only to remove looseness between the threads of the fastener and between the fastener parts and anvil member 57. During this preliminary wrenching step the friction between the relatively moving parts, including the friction between the threads is opposed by leaf spring 31. Consequently, there is substantially no pivotal movement of handle 26 relative to arm 12, and latch detent 29 remains seated within notch 20, thereby locking the indexing ring in its zero setting. However, should a wrenching force sufficient to start tensioning the bolt be applied to the wrench, the spring flexes allowing handle 26 to pivot against stop 34 and latch detent 29 to pivot out of locking engagement with the indexing ring, thereby indicating the end of the preliminary wrenching phase and the start of the final wrenching phase.

While the indexing ring is held against rotation, the operator wrenches the nut clockwise through pressure applied to handle 26 and observes movement of pointer 55 relative to the scale of gauge 53, it being understood that the tightening of the nut and bolt causes the bolt to elongate, thereby moving the plungers 48 and 54 upward relative to frame 41 and the case of gauge 53 rigidly secured thereto. The wrenching is continued until pointer 55 shows that bolt 14' has elongated the predetermined known amount required to place a bolt of its size and material under a maximum permissible load slightly below or equal to the yield stress of the material. At this point, and while still holding handle 26 in abutting engagement with stop screw 34, the operator reads the position of edge 30 of latch detent 29 relative to scale 21. Assuming that edge 30 is opposite the 75 degree reading on scale 21, the operator knows that this same fastener and all fasteners of like size and material may be tightened to an identical maximum permissible loaded stress by wrenching them through a final arc of 75 degrees and without regard to whether the final wrenching operation is carried on in a continuous and uniform manner, and without regard to the presence or absence of lubrication between the threads or the other variables which affect the use of a torque wrench. It is, of course, understood that the final wrenching arc referred to begins at the point at which all looseness has been removed from the assembly and the point at which the bolt begins to tension.

After the bolt has been tensioned in the manner described above, the indexing dial is rotated counterclockwise until opening 20 is opposite latch detent 29, thereby permitting the detent to enter the opening under the influence of spring 31 to lock the parts in readiness for the next wrenching operation and to assure that slot 19 of the indexing ring will be aligned with the nut receiving slot 13 in the wrench head. The wrench unit is withdrawn from the nut and set screw 46 is loosened so that the zero adjusting screw 43 can be loosened and the extensometer detached from the fastener.

Once the arc of final wrenching for a given fastener has been determined, any number of the fasteners may be assembled and loaded to identical final stress loads merely by wrenching them through a final arc of 75 degrees. It is therefore unnecessary to use the extensometer unit in tightening other identical fasteners, but in doing so it will be convenient to adjust stop 24 along flange 18 until its right-hand vertical side wall, as viewed in Figure 4, is opposite the 75 degree reading on scale 21 whereupon set screw 25 is tightened to lock it in adjusted position. Accordingly, in tightening succeeding fasteners stop 24 engages the sloping edge 30 of latch detent 29 as the end of the final wrenching arc is reached. The contact of the latch with the stop will be instantly sensed by the hand of the operator.

If the operator wishes to use the apparatus just described for tightening fasteners of a different type, size or material, he follows the same steps described above to determine the particular arc of final wrenching required for the new fastener, making use of the extensometer as described above. Assuming that this arc is 96.5 degrees, the operator knows that the other fasteners of the same design, size and material should be wrenched through the same arc to load them to the desired maximum permissible stress.

In some instances the user may have a fastener of known material having a known yield point stress and a known modulus of elasticity, but he will be uncertain of the elongation required to place it under the maximum permissible load stress. This elongation can be easily calculated since the elongation of the bolt due to tensile forces imposed on it by tightening a nut is directly proportional to the stress acting on the bolt and inversely proportional to the modulus of elasticity of the material of which it is made, and is expressed by the equation:

$$\text{Elongation} = \frac{\text{Stress}}{\text{Modulus of Elasticity}}$$

Assuming that the bolt and nut under test are made of medium carbon steel having a yield point stress of 65,000 pounds per square inch and a modulus of elasticity of 30,000,000 and substituting these values in the equation, it is found that the bolt elongates 0.0022 inch per inch of length in being tightened to the specified load stress. If the distance between the adjacent faces of the fastener head and its nut is 2.0 inches, the bolt will elongate 0.0044 inch, or 44 mils on indicator gauge 53. With this information at hand, the operator determines the arc of final wrenching to produce this elongation following the technique described above for the use of the extensometer unit in combination with the wrench unit. Once the arc of final wrenching for this fastener has been determined, all other like fasteners may be tightened to the same load stress using the newly discovered arc of final wrenching in the described manner with wrench unit 10.

It is also feasible to determine the wrenching arc required to load a bolt type fastener, for example, to its maximum permissible stress load with the screw tensioning apparatus of the present invention, even though its material and strength properties are unknown. This is accomplished simply by following the tightening procedure above described except that the nut is successively tightened and loosened through final wrenching arcs of progressively increasing angular extent. Care is exercised to complete each tightening and loosening cycle with latch detent 29 exactly opposite the starting point or the zero reading on the scale of the indexing ring, whereupon the operator checks pointer 55 on gauge 53 to determine whether the pointer has returned exactly to its zero setting. After a series of tightening operations performed through gradually increasing wrenching arcs, pointer 55 will fail to return exactly to its zero setting and the operator will then know that the preceding wrenching arc was slightly too long and loaded the bolt beyond the elastic limit or yield stress of the material. Accordingly, that fastener as well as others identical with it, may be tightened uniformly to a maximum permissible loading short of the material's elastic limit by wrenching them through identical wrenching arcs slightly less than the arc producing bolt yield by using the wrench of this invention and the information obtained in the manner described.

While the particular apparatus and method herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. In combination, a readily portable screw tensioning apparatus for loading threaded fastening devices at a place of assembly of components utilizing said fastening devices to a desired stress approaching the elastic limit of the fastener material, said apparatus comprising a rigid frame bridging the length of a threaded fastener member to be tensioned by wrenching the fastener member relative to a cooperating threaded member, said rigid frame being adapted for support directly by the opposite ends of the fastener member to be tensioned, said frame including an elonagtion measuring gauge having an elongation sensing member positioned to be moved by the elastic lengthening of said fastener member, and wrenching means for rotating said threaded members together having an arc measuring scale movably supported thereon concentric with the axis of wrenching for measuring the arc of wrenching required to elongate the member being tensioned to the elastic limit of the fastener material as measured by said elongation gauge.

2. That method of tensioning a two-part threaded fastening device to hold components assembled with the fastening device loaded to a stress approximating the elastic limit of the fastener material which comprises, tightening the fastener device against parts to be clamped to remove all looseness axially of the fastening device, wrenching one threaded part into the other through a measured arc in a plane normal to the axis of the fastener while measuring the elongation of the threaded part being tensioned, and discontinuing said wrenching as the measured elongation reaches a stress value approximating the elastic limit of the fastener material.

3. That method of tensioning a series of identical two-part threaded fastening devices to substantially the elastic limit of the fastener material which comprises, assembling one of the devices through aligned openings in parts to be fastened together, tightening the fastener against said parts to remove all looseness axially of the fastener, wrenching one threaded part into the other through a measured arc in a plane normal to the axis of the fastener, while measuring the resultant elongation of the threaded part being tensioned, discontinuing said wrenching as the elongation reaches a value indicative of the elastic limit of the fastener material, and thereafter utilizing the arc of final wrenching so obtained to tighten fasteners identical with the first one uniformly to the same final load stresses, without measuring the elongation of the same.

4. An apparatus for tensioning threaded fastener devices while holding components assembled uniformly to a desired ultimate load stress comprising, an extensometer having a frame adapted to bridge the length of a threaded fastener member extending through assembled components and having opposed conical members adapted to seat in conical recesses at the opposite ends of said fastener member, spring means urging one of said conical members toward the other and of sufficient strength to hold the extensometer in place in the recesses at the ends of said fastener, gauge means secured to said frame having a sensing member bearing against said spring-pressed member and operable to actuate said gauge to show the elongation of said fastener during the tightening of the same, wrenching means having a head adapted to engage a second threaded part of the fastener device and to rotate the same as a rotating force is applied to the wrenching means, cooperating scale and pointer means for measuring the angular extent of the wrenching required to elongate said first-mentioned fastener member a predetermined amount, as measured by said elongation gauge and indicative of a load stress approximating the elastic limit of the fastener material, whereby the wrenching arc so determined may be used to tighten identical fastener devices of the same material uniformly to the same load stress.

5. An apparatus for tensioning threaded fastener devices as defined in claim 4, wherein said cooperating scale and pointer means for measuring the wrenching arc are carried by said wrenching means and wherein said scale is supported on a ring concentric with the axis of rotation of the wrenching means.

6. An apparatus for tensioning threaded fastener devices as defined in claim 4, wherein said wrenching means comprises a wrench head having a fastener engaging opening therein and handle means secured thereto for turning said head about the axis of the opening when the same is attached to a fastener to be wrenched, means movably supporting said scale on said wrench head, whereby the same may be held against rotation with the wrench, as the fastener is tensioned, and said pointer being carried by said handle and movable along said scale to measure the wrenching arc.

7. An apparatus for tensioning threaded fastener devices as defined in claim 6, wherein said handle is pivotally connected to said wrench head for movement through a small limited arc in the plane of said wrench head, and spring means normally urging said handle to pivot in a direction opposite to the direction of wrenching, to tighten a fastener with a force substantially equal to the torque required to remove looseness from the parts being tightened together.

8. An apparatus for tensioning threaded fastener devices as defined in claim 1, wherein the wrenching means includes a handle pivotally connected to said wrench head and normally spring biased in a direction opposite to the direction of wrenching to tighten a fastener, said scale means including a ring movably supported on said head concentric with the axis of a fastener device being wrenched, said pointer means being carried by said pivoted handle, spring means for holding said pointer means engaged with said scale ring, said spring means being adapted to flex and disengage said pointer means from said scale means as a torque force sufficient to start tensioning of the fastener is applied to the wrench handle, whereby said disengaged scale may be held stationary and cooperate with said pointer means in measuring the wrenching arc required to tension the fastener from zero stress to a stress approximating the elastic limit of the fastener material.

9. A hand-held readily portable wrench for use in tensioning threaded fasteners to a predetermined stress load comprising, a wrench head having an opening providing a seat for a threaded member, handle means pivoted to said head, spring means interposed between said head and said handle means at points spaced from said pivot and urging said handle to pivot in a direction counter to the direction of wrenching to tighten a fastener, scale means movably mounted on said head concentric with said seat, and indicator means movable with said handle means along said scale for measuring an arc of final wrenching beginning as said spring yields, to indicate that the fastener has been tightened to remove all looseness between the parts and continuing until the wrench has been rotated through a predetermined arc measured by said scale and known as required to tension the fastener to a desired stress.

10. A wrench comprising a wrench head having an opening providing a seat adapted to engage a threaded fastener to tighten the same, an operating handle pivoted to an extension arm from one side of said head for pivotal movement relative to said head in a direction generally parallel to a plane across the opening in the wrench head, spring means interposed between said handle and said arm for urging said handle to pivot counter to the direction of wrenching to tighten a fastener, and pointer means carried by said handle and terminating at one side of the axis of said opening in the wrench head, said pointer means being cooperable with a scale concentric with said seat while the scale is held stationary, to measure the arc of final wrenching after said spring yields, to indicate that a fastener has been wrenched to remove looseness between the parts being tightened.

11. A wrench comprising a wrench head having an opening for receiving one of a pair of threaded fasteners adapted to be screwed together, a ring including a scale mounted on said head for rotary movement about an axis extended through said opening, handle means pivotally connected to said head including spring means for urging said handle to pivot relative to movement in tightening a fastener, said handle having pointer means positioned for movement along said scale to measure an arc of final wrenching after said spring yields and while said ring is manually held against rotation.

12. A wrench as defined in claim 11, wherein said scale supporting ring and said wrench head include means for holding the ring against rotation relative to said wrench head.

13. A wrench as defined in claim 11, wherein said ring and said pointer means on said handle have inter-engaging surfaces adapted to hold the scale in a selected position opposite said pointer means until said spring means yields as a fastener is tightened to the point required to remove all looseness between the parts, said pointer means being movable out of holding engagement with said scale ring as said spring means yields whereby said pointer means is free to move relative to said scale ring to measure an arc of final wrenching.

14. A wrench as defined in claim 11, wherein said scale supporting ring has a peripheral flange provided with a shoulder, said pointer means extending radially across said shoulder normally to hold said scale in a predetermined setting relative to said pointer means, said pointer means being pivotable out of engagement with said shoulder as said spring means yields upon the exertion of a predetermined force marking the end of an initial wrenching operation to indicate that all looseness has been removed between the fastener parts.

15. A wrench comprising, a flat head having a slotted opening with a non-circular inner end adapted to fit about the similarly shaped end of a threaded fastener, an arm projecting from said head opposite said slotted opening, a hollow handle substantially enclosing the outer end of said arm and having its forward end pivoted to said arm near said head, light spring means interiorly of said handle and between said arm and handle urging said handle from the arm in a direction counter to the direction of wrenching to tighten a fastener, a scale supporting ring rotatably mounted on said head concentric with an axis extended through said non-circular inner end of said opening, and pointer means carried by said handle adjacent said scale ring normally operable to hold the scale against rotation relative to said head and cooperable with the ring as the latter is manually held stationary to measure a desired arc of final wrenching to begin upon said spring means yielding to indicate that the parts have been tightened to remove looseness between the fastener parts, and the yielding of said spring means being operable to move said pointer means out of holding engagement with said scale ring.

16. A wrench as defined in claim 15, wherein said scale supporting ring is provided with movable stop means adapted to be secured in any desired position along said ring and in the path of said pointer means, whereby contact of the pointer means with the stop means serves to indicate that the fastener has been wrenched through the desired final arc represented by the preselected setting for said stop means.

17. An extensometer for measuring the elongation of a threaded member as it is placed under tension comprising, a C-shaped frame, the ends of said frame having aligned members mounted therein with adjacent ends adapted to seat in conical depressions at the opposite ends of a bolt to be tensioned, one of said members being movable and normally supported in said frame and spring pressed toward the other member to hold said aligned members firmly seated in the depressions of said bolt, and an elongation measuring device rigidly secured to said frame and having a movable actuating member in contact with said movable member.

18. An extensometer comprising a frame provided with spaced extensions to bridge a bolt to be tensioned, aligned members having seating ends pointing toward one another and movably supported by said spaced extensions, means slidably mounting one of said members and resiliently urging the same toward the other of said members, and a sensitive elongation measuring device supported on said frame having a movable actuating member bearing on the slidable member and responsive to the movement thereof to actuate said measuring device.

19. An extensometer as defined in claim 18, wherein the other of said aligned seating members is axially adjustable to bring the measuring device to a desired initial reading after the extensometer has been mounted on a bolt to be tensioned with the ends of said members seated against the opposite ends of the bolt.

20. An extensometer as defined in claim 18, wherein the other of said aligned seating members comprises a screw adjustably supported in said frame for movement toward and away from said slidably supported member, and means for locking said screw in any adjusted position.

21. A readily portable extensometer adapted to be mounted on bolts while in place in components held assembled thereby, said extensometer comprising a frame having extensions adapted to bridge a bolt to be tensioned, aligned members movably mounted in said extensions and having aligned ends adapted to seat against the opposite ends of a bolt, spring means urging one of said members toward the other, and sensitive gauge means having an actuating member seated against one of said movable members for indicating the elongation of a bolt supported between the ends of said members as it is tensioned.

22. An extensometer comprising a frame provided with extensions spaced apart a distance greater than the length of a bolt to be tensioned, aligned members movably mounted in said extensions and having tapered ends extending toward each other, and sensitive gauge means secured to said frame having an actuating member bearing against and movable with one of said members.

23. A wrench for use in tensioning threaded fasteners to a predetermined stress load comprising, a wrench head having a seat engageable with a threaded member, handle means pivoted to said head, spring means interposed between said head and said handle means at points spaced from said pivot and urging said handle to pivot in a direction counter to the direction of wrenching to tighten a fastener, indicator means to measure an arc of final wrenching beginning as said spring means yields to indicate that the fastener has been tightened to remove all looseness between the parts and continuing until the wrench has been rotated through a predetermined arc measured by said indicator means and known as required to tension the fastener to a desired stress.

24. A wrench comprising a wrench head having an opening providing a seat adapted to engage a threaded fastener to tighten the same, an operating handle pivoted to an extension arm from one side of said head for pivotal movement relative to said head in a direction generally parallel to a plane across the opening in the wrench head, spring means interposed between said handle and said arm for urging said handle to pivot counter to the direction of wrenching to tighten a fastener, and pointer means carried by said handle and terminating at one side of the axis of said opening in the wrench head, said pointer means being cooperable with a ring and an adjustable member thereon concentric with said fastener seat to measure the arc of final wrenching after said spring means yields to indicate that a fastener has been wrenched to remove looseness between the parts being tightened.

25. A hand-held wrench for use in tightening threaded fasteners to a predetermined load stress, said wrench comprising a pair of members having limited rotary movement relative to one another in a plane normal to the axis of a fastener device to be tightened, one of said members comprising an elongated handle, the other of said members being engageable with a non-circular portion of a threaded fastener and adapted to rotate the same relative to another fastener element, spring means urging said members apart and adapted to be overcome as the fasteners are tightened to the point of removal of looseness between the parts, and means carried by the wrench for measuring a final arc of wrenching as the fastener is wrenched beyond said point of looseness removal.

26. A hand-held wrench as defined in claim 25, wherein said means for measuring the final arc of wrenching includes a scale movably carried by one of said members, means for locking said scale against movement relative to said one member during wrenching to remove said looseness between the parts, and means for automatically disengaging said scale from said elongated handle at the point of looseness removal, whereby said scale can be held stationary to measure the arc of final wrenching.

References Cited in the file of this patent

UNITED STATES PATENTS

| | | |
|---|---|---|
| 2,030,464 | Nilson | Feb. 11, 1936 |
| 2,544,522 | Bertelsen | Mar. 6, 1951 |
| 2,631,485 | Stuart et al. | Mar. 17, 1953 |
| 2,734,412 | Orner | Feb. 14, 1956 |
| 2,736,219 | May | Feb. 28, 1956 |
| 2,756,622 | La Belle | July 31, 1956 |
| 2,760,393 | Stough | Aug. 28, 1956 |

UNITED STATES PATENT OFFICE

CERTIFICATE OF CORRECTION

Patent No. 2,889,729                              June 9, 1959

Harry Orner

It is hereby certified that error appears in the above numbered patent requiring correction and that the said Letters Patent should read as corrected below.

Column 7, line 39, for the claim reference numeral "1" read -- 4 --.

Signed and sealed this 13th day of October 1959.

(SEAL)

Attest:

KARL H. AXLINE
Attesting Officer

ROBERT C. WATSON
Commissioner of Patents

UNITED STATES PATENT OFFICE

CERTIFICATE OF CORRECTION

Patent No. 2,889,729                                        June 9, 1959

Harry Orner

It is hereby certified that error appears in the printed specification of the above numbered patent requiring correction and that the said Letters Patent should read as corrected below.

Column 3, line 73, for "conical", first occurrence, read -- suitably-shaped --; line 75, strike out "suitably-shaped" and insert instead -- conical --.

Signed and sealed this 19th day of January 1960.

(SEAL)
Attest:

KARL H. AXLINE
Attesting Officer

ROBERT C. WATSON
Commissioner of Patents